US010113939B2

(12) United States Patent
Osterhage et al.

(10) Patent No.: US 10,113,939 B2
(45) Date of Patent: Oct. 30, 2018

(54) TEST ARRANGEMENT FOR TESTING DAMPER DEVICES FOR DAMPING A FLAP THAT IS PIVOTABLE ABOUT A REAL PIVOT AXIS AND METHOD FOR TESTING THE DAMPER DEVICES

(71) Applicant: GM GLOBAL TECHNOLOGY OPERATIONS LLC, Detroit, MI (US)

(72) Inventors: Klaus Osterhage, Rüsselsheim (DE); Juergen Fischer, Rüsselsheim (DE); Siegfried Schindler, Rüsselsheim (DE); Robert Bender, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 15/160,064

(22) Filed: May 20, 2016

(65) Prior Publication Data

US 2016/0341634 A1  Nov. 24, 2016

(30) Foreign Application Priority Data

May 21, 2015  (DE) ........................ 10 2015 006 631

(51) Int. Cl.
*G01M 17/04* (2006.01)
*G01M 17/007* (2006.01)
(Continued)

(52) U.S. Cl.
CPC .............. *G01M 17/04* (2013.01); *G01M 1/04* (2013.01); *G01M 1/32* (2013.01); *G01M 1/36* (2013.01); *G01M 17/007* (2013.01)

(58) Field of Classification Search
CPC ............ G01M 1/32; G01M 1/36; G01M 1/04; G01M 17/04
See application file for complete search history.

(56) References Cited

U.S. PATENT DOCUMENTS 4,452,015 A   6/1984  Jacques et al.
4,973,097 A   11/1990 Hosan et al.
(Continued)

FOREIGN PATENT DOCUMENTS

CN   101685041 A   3/2010
CN   201476968 U   5/2010
(Continued)

OTHER PUBLICATIONS

German Patent Office, German Search Report for German Application No. 102015006630.7, dated Jan. 25, 2016.
(Continued)

*Primary Examiner* — Paul West
(74) *Attorney, Agent, or Firm* — Lorenz & Kopf, LLP

(57) ABSTRACT

A test arrangement 1 for testing damper devices 2 for damping a flap 3 that is pivotable about a flap pivot axis Ar, wherein the test arrangement 1 includes a test stand 4 with a pivot axis A, which is designed as a simulation of the flap pivot axis Ar, wherein the test arrangement 1 includes a test frame 5, wherein the test frame 5 is designed as a function model of the flap 3, wherein the test frame 5 includes a connecting device 7 for the pivotable connection to the test stand 4 about the pivot axis A, wherein the test arrangement 1 includes at least two damper devices 2 for the dampened pivoting of the test frame 5 about the pivot axis A.

16 Claims, 7 Drawing Sheets

(51) Int. Cl.
*G01M 1/04* (2006.01)
*G01M 1/32* (2006.01)
*G01M 1/36* (2006.01)

(56) References Cited

U.S. PATENT DOCUMENTS

| | | |
|---|---|---|
| 5,769,191 A | 6/1998 | Cole et al. |
| 2005/0104413 A1 | 5/2005 | Bauman et al. |
| 2009/0202292 A1 | 8/2009 | Shoemaker et al. |

FOREIGN PATENT DOCUMENTS

| | | | |
|---|---|---|---|
| CN | 201680977 U | | 12/2010 |
| CN | 102221442 A | | 10/2011 |
| CN | 202757756 U | | 2/2013 |
| CN | 203534807 U | * | 4/2014 |
| CN | 203745183 U | | 7/2014 |
| DE | 4000862 A1 | | 7/1991 |
| DE | 9307092 U1 | | 9/1993 |
| DE | 29603081 U1 | | 4/1996 |
| DE | 19828779 A1 | | 12/1999 |
| DE | 10357413 A1 | | 7/2005 |
| DE | 102004017753 A1 | | 10/2005 |
| DE | 202007004999 U1 | | 8/2008 |
| EP | 0972610 A2 | | 1/2000 |
| JP | 2009174916 A | | 8/2009 |
| KR | 100188421 B1 | | 6/1999 |
| KR | 100857202 B1 | | 9/2008 |
| KR | 20080113582 A | | 12/2008 |
| WO | 2010072126 A1 | | 7/2010 |

OTHER PUBLICATIONS

Great Britain Patent Office, Great Britain Search Report for Great Britain Application No. 1608736.3, dated Oct. 14, 2016.
Great Britain Patent Office, Great Britain Search Report for Great Britain Application No. 1608734.8, dated Nov. 8, 2016.
German Patent Office, German Search Report for German Application No. 102015006631.5, dated Jan. 22, 2016.

* cited by examiner

TEST ARRANGEMENT FOR TESTING DAMPER DEVICES FOR DAMPING A FLAP THAT IS PIVOTABLE ABOUT A REAL PIVOT AXIS AND METHOD FOR TESTING THE DAMPER DEVICES

CROSS-REFERENCE TO RELATED APPLICATION

This application claims priority to German Patent Application No. 102015006631.5, filed May 21, 2015, which is incorporated herein by reference in its entirety.

TECHNICAL FIELD

The present disclosure pertains to a test arrangement for testing damper devices for a pivoting flap on a vehicle, and in particular a test stand simulating a real pivot axis, a test frame formed as a function model of the flap and a connecting device for the pivotable connection to the pivot axis.

BACKGROUND

Test arrangements for damper devices, which are formed for the dampened pivoting of a vehicle flap about a pivot axis, are employed for function testing the damper devices. A damper device to be tested is connected to the vehicle flap in such a manner that the same is dampened upon a pivot movement about the pivot axis. In the process, the functionality of the damper device is tested. For example, CN 101 685 041 B describes a test system for simulating an air spring for a pivotable tailgate of a vehicle. The test system makes possible simulating practically relevant working conditions of the air spring and of the tailgate. In particular, a planned installation position and a weight of the tailgate are simulated.

SUMMARY

The present disclosure provides a functionally improved and flexibly employable test arrangement for testing damper devices. Disclosed is a test arrangement for testing damper devices. The damper devices are formed for damping a flap that is pivotable about a real pivot axis. For example, the flap is formed as a vehicle flap, in particular as a lift gate, tail gate or boot flap, (also called a trunk or deck lid) of the vehicle. Preferably, the flap is pivotable about the real pivot axis from a closed position into an opened position. The damper devices support an opening movement from the closed into the opened position and dampen a closing movement from the opened position into the closed position. For example, the damper devices may be formed as gas pressure springs.

The test arrangement includes a test stand with a pivot axis formed as a simulation of the real pivot axis. In particular, the pivot axis of the test stand simulates the function of the real pivot axis of the flap. The test arrangement includes a test frame formed as a function model of the flap. Preferably, the test frame has a center of gravity and a total mass. Preferably, the center of gravity is formed as a mass center of gravity of the test frame. In particular, the test frame with respect to its center of gravity, with respect to its mass and/or with respect to its kinematic configuration is reproduced and/or reproducible based on a flap center of gravity, a flap total mass and/or a flap kinematic configuration. The test frame includes a connecting device. By way of the connecting device, the test frame is pivotably connectable and/or connected about the pivot axis to the test stand. For example, the connecting device makes possible a positive and/or non-positive connection of the test frame to the test stand that is pivotable about the pivot axis.

The test arrangement includes at least two damper devices, preferably exactly two damper devices, which are formed for the dampened pivoting of the test frame about the pivot axis. In particular, the at least two damper movements support the opening movement simulated by the test frame and dampen the closing movement of the flap simulated by the test frame. Because of the fact that the test arrangement includes at least two damper devices and because of the fact that the test frame forms a function model of the flap, the functionality of the damper devices in real operation of the flap can be tested in an advantageous manner.

In a preferred configuration of the present disclosure, the total mass of the test frame, the center of gravity of the test frame and/or a coupling point for coupling each of the at least two damper devices to the test frame are variably determinable and/or adjustable. Because of this, the flap total mass, the flap center of gravity and/or flap coupling points for coupling the at least two damper devices can be realistically reproduced and/or simulated. Through the variable adjustability, a plurality of flaps of any design with different flap total masses, flap centers of gravity and/or flap coupling points can be realistically reproduced. In particular, the test arrangement is flexibly employable for testing damper devices in real operation of flaps of different design. Specifically, the test frame can be easily and briskly adapted to a wide range of configurations of all kinds of flaps. Because of this, a dynamic behavior of any flaps can be reproduced with the test frame. Preferably, adjusting data of the test arrangement, in particular of the test frame, are calculable based on table calculation. Because of this, an adjustability and variability of the test arrangement in the application can be increased, as a result of which a quick, effective and cost-effective testing of the damper devices can be ensured.

A preferred configuration of the present disclosure provides that the test frame includes at least two rails, preferably exactly two rails. For example, the at least two rails are formed as at least two profile rails. This makes possible in a manner a shifting of equipment and/or devices, which are arranged in a profile of the rails. Optionally, the rails run equidirectional relative to one another, in particular parallel.

Preferably, each of the rails includes a coupling device, via which the at least two damper devices are connectable and/or connected to the respective rail. In particular, each of the damper devices is coupleable to the corresponding rail via the coupling device. By shifting along the rails, the position of the coupling device can be adjusted independently of a relative angle, at which the respective damper device is coupled to the coupling device, and/or substantially independently of the center of gravity of the test frame.

In a preferred implementation of the present disclosure, the coupling device is shiftable along the respective rail. For example, the coupling device is formed as a slide that is shiftable on the respective rail, in particular profile rail. Because of this it is achieved that a distance between the pivot axis and the coupling device is variably adjustable. In particular, a distance between the pivot axis and the coupling point, at which the respective damper device is coupled and/or coupleable to the test frame, is variably adjustable.

In a preferred design implementation of the present disclosure, the coupling device includes a receiving device and an adjusting device. For example, the adjusting device is designed in order to adjust the coupling point. Preferably, the receiving device is designed in order to receive, in particular shiftably receive the adjusting device. Preferably, the adjusting device includes an engagement device, which is designed for engaging in the receiving device. In particular, the adjusting device is shiftable in a first direction, which is directed along the receiving device, via the engagement device. Thus, the adjusting device in the receiving device is variably positionable and fixable. Because of this, it is advantageously ensured that a distance between the adjusting device and a plane that is arranged at an angle, in particular right angle relative to the pivot axis and/or a distance between the adjusting device and the respective rail is variably adjustable. Particularly preferably, a distance between the coupling point and the plane and/or the respective rail is variably adjustable. Because of this, a positioning of the flap coupling point can be realistically simulated.

In a preferred design configuration of the present disclosure, the engagement device includes at least one engagement component, preferably two or more engagement components. Preferably, the receiving device includes at least one recess, in which the at least one engagement component is positively locked or lockable. Preferably, a positive connection is formed between the at least one receiving device and the at least one engagement component in a second direction that is directed at an angle, in particular right angle relative to the first direction. Because of this it is advantageously ensured that the adjusting device is securely connected and/or connectable to the receiving device and at the same time the shifting in the first direction is ensured. In a preferred configuration of the present disclosure, the adjusting device includes a foot, a neck and a head.

Preferably, the foot is directly or indirectly connected to the receiving device. In particular, the foot is arranged at or on the engagement device. For example, the foot supports the neck. In particular, the head is preferably arranged on the neck in a rotationally fixed manner. For example, the foot and/or the neck are formed L-shaped or substantially U-shaped in a lateral top view. In particular, the foot and the neck each include a short and a long leg, which forms the L-shape of the foot and of the neck. Particularly preferably, the neck with its long leg is connected to the long leg of the foot.

Preferably, the head includes a coupling interface for the respective damper device. Optionally, the coupling interface is designed for the positive and/or non-positive coupling to the respective damper device. In particular, the coupling interface defines the coupling point at which the respective damper device is coupled and/or coupleable. For example, the coupling interface is formed spherically. Preferably, the coupling interface is variably adjustable relative to the receiving device. In particular, the coupling interface is adjustable by way of the adjusting device in at least two rotation degrees of freedom, in particular in exactly two rotation degrees of freedom. Because of this, the coupling device is universally designed for connecting the damper device to the test frame. In particular, a plurality of different flaps can be realistically reproduced by the test frame. Through the variable adjustability of the coupling interface, coupling connecting points of a wide range of flaps can be realistically reproduced on the test frame and in particular positioned in the test arrangement. Because of this, a flexible connection to the test frame can be achieved and the testing of the damper devices be carried out saving time and costs.

For the positive and/or non-positive coupling to the coupling interface of the respective adjusting device, each of the two damper devices includes a coupling mating interface. For example, the head is formed as a sphere and the coupling mating interface as a semi-spherical hollow body, wherein the sphere is engagable in the hollow body.

Preferably, the foot is rotatable about a first axis of rotation relative to the engagement device. Particularly preferably, the neck, jointly with the head, is rotatable about a second axis of rotational relative to the foot. In particular, the foot and the neck are arranged in a kinematic chain relative to one another. Because of this, the neck is rotatable about the first axis of rotation jointly with the foot relative to the engagement device. It is preferred that the first and the second axis of rotation run at an angle, in particular at a right angle relative to one another. Optionally, the first and second axes of rotation intersect at a point of intersection.

Preferably, the coupling point is constrained in the at least two rotation degrees of freedom independently of the adjustment of the adjusting device. Preferably, the coupling point is constrained independently of a first and of a second axis. The first and second axis run at an angle, in particular at a right angle, to one another and to a third axis, wherein the third axis runs centrally through the coupling interface and through a connection of the coupling interface to the neck. For example, the first axis corresponds to the first pivot axis and the second axis to the second pivot axis, so that the coupling point is constrained independently of an angle of rotation of the foot about the first pivot axis and/or independently of an angle of rotation of the neck about the second pivot axis.

Particularly preferably, the coupling interface and/or the coupling point are always arranged in the point of intersection of the two axes of rotation independently of an angle of rotation of the foot about the first pivot axis and/or independently of an angle of rotation of the neck about the second pivot axis. The arrangement of the coupling interface and/or of the coupling point in the point of intersection is in particular independent of the adjustment of the angle of rotation of the foot and/or of the neck. Furthermore, the arrangement of the coupling interface and/or of the coupling point is independent of parameters such as any determination of the center of gravity, any determination of distances within the test stand, the test frame and/or the rails, in particular independently of the positioning of the coupling device on the rails. In particular, a relative angle between the respective coupling interface of the head and the corresponding coupling mating interface of the damper device is variably adjustable by adjusting the coupling device through the adjusting device in the at least two rotation degrees of freedom, in particular through the adjustment of the angle of rotation of the foot about the first pivot axis and through adjusting the angle of rotation of the neck about the second pivot axis. Preferably, the relative angle is adjustable independently of at least one, preferably all aforementioned parameters. Thus, hooking-up and/or jamming during the coupling of the damper device to the respective coupling interface can be avoided. In particular, simple and secure coupling of the damper device to the coupling interface is ensured.

A preferred implementation of the present disclosure provides that the test frame includes at least one mass compensation device. For example, the at least one mass compensation device is designed as at least one weight component that is variable with respect to its mass and can be attached to the test frame. Through the at least one mass compensation device, the center of gravity of the test frame can be determined and adjusted as desired.

Preferably, the at least one mass compensation device includes at least one first mass compensation device which is variable in mass and which is constrained on the test frame. Optionally in addition, the at least one mass compensation device includes at least one second mass compensation device, which is variable in mass and with respect to its position on the test frame. For example, the position change of the at least one second mass compensation device is realizable by a shifting along the at least two rails. Through the at least one mass compensation device that is variable in mass and/or position, the total mass and the center of gravity of the test frame are variably determinable and/or adjustable. It is possible within the scope of the present disclosure that the at least one second mass compensation device includes a first and a second non-stationary mass compensation device, which is shiftable along the two rails. Because of this it can be achieved in an advantageous manner that the center of gravity when the two non-stationary mass compensation devices are shifted, in particular by a distance in opposite directions of the same size, remains stationary and/or is not changed with respect to its position. Preferably, the mass moment of inertia of the test frame is variably adjustable about the pivot axis, in particular independently of the stationary position of the center of gravity, through the shifting of both non-stationary mass compensation devices. Because of this, the test frame can be adapted in an advantageous manner to any flaps with different flap total masses and flap centers of gravity and in the test stand realistically simulate their dynamics.

A further subject of the present disclosure relates to a method for testing the damper devices with the test arrangement as provided herein. Within the scope of the method, the total mass of the test frame, the center of gravity of the test frame and/or the coupling point for coupling each of the at least two damper devices to the test frame are variably determined and/or adjusted.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
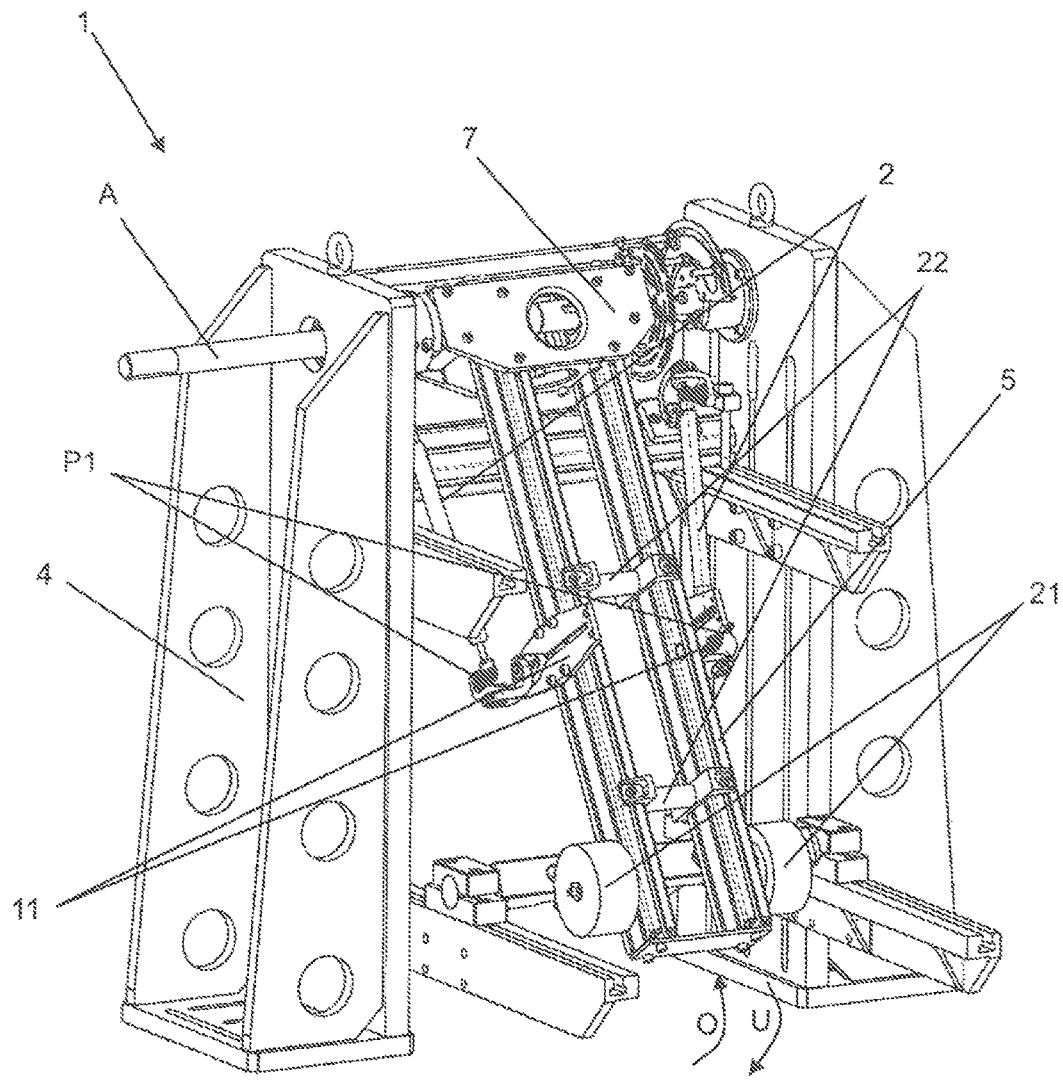
FIG. 1 is a perspective view from the front of a test arrangement with a test stand, a pivot axis, two damper devices and a test frame.

The following detailed description is merely exemplary in nature and is not intended to limit the invention or the application and uses of the invention. Furthermore, there is no intention to be bound by any theory presented in the preceding background of the invention or the following detailed description. Same parts or parts which correspond to one another are in each case marked with the same reference characters in the figures.

Figure 2:
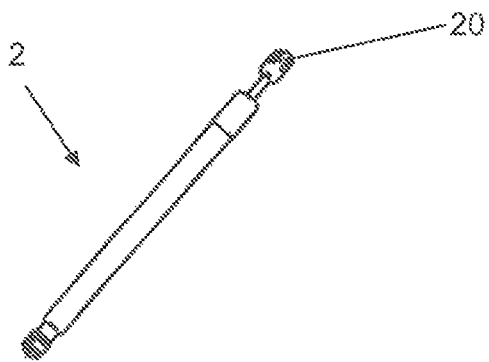
FIG. 2 is a perspective top view of one of the two damper devices from FIG. 1.

FIG. 1 shows a test arrangement 1 for testing the function of damper devices 2. One of the damper devices 2 is shown in a perspective view in FIG. 2. The damper devices 2 are designed for example as gas pressure springs. They are designed for damping a flap 3 that is pivotable about a flap pivot axis Ak. The flap 3 according to FIG. 3A is designed as a vehicle flap, in particular as a tailgate or boot lid of a vehicle 6, in particular of a passenger car.

Figure 3A:
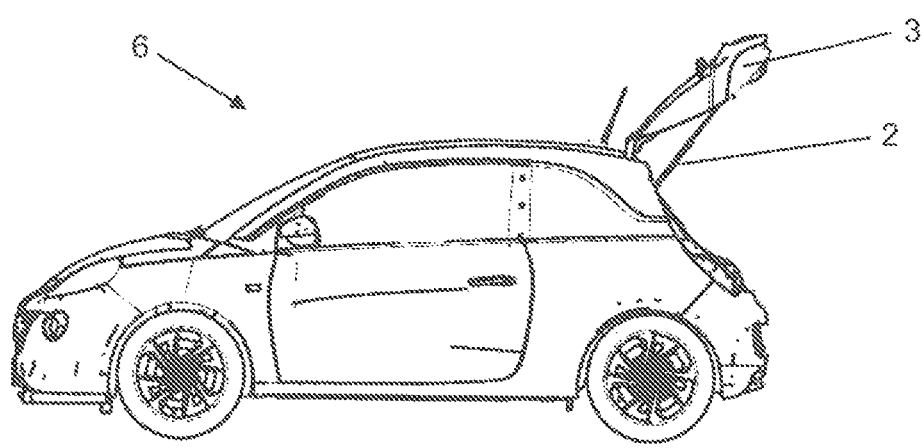
FIG. 3A is a vehicle with a flap that is pivotable about a real pivot axis.
Figure 3B:
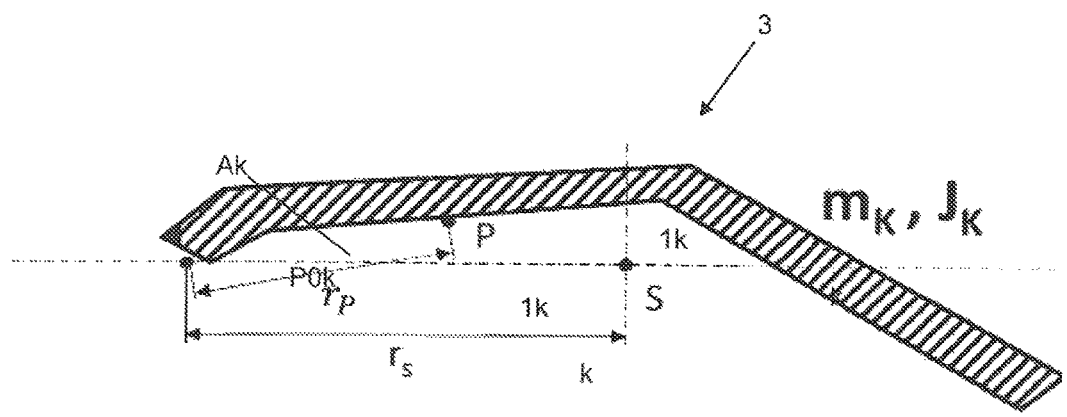
FIG. 3B is a sectional view of the vehicle flap from FIG. 3A, wherein a section line runs from the real pivot axis to a moveable end of the vehicle flap.

The flap 3 in FIG. 3B is shown in a sectional view, wherein the section line runs from the flap pivot axis Ak to a free end of the flap 3. The flap 3 has a flap total mass mk and a flap center of gravity Sk. The flap 3 is pivotable through an opening movement about the flap pivot axis Ak from a closed position into an opened position according to FIG. 3A. Through a closing movement, the flap 3 is pivotable about the flap pivot axis Ak from the open position into the closed position. The damper devices 2 support the opening movement and dampen the closing movement of the flap 3.

The damper devices 2 according to FIG. 3A are fastened on the vehicle side. Each of the damper devices 2 according to FIG. 3B is connected to the flap 3 in a flap connecting point P1k. To this end, each of the damper devices 2 includes a coupling mating interface 20 (FIG. 2), by way of which the respective damper device 2 is positively and/or non-positively coupled to the flap 3 (not shown) in the flap connecting point P1k. The coupling mating interface 20 is also designed for the positive and/or non-positive coupling to a coupling interface 19 (FIG. 6) of the test arrangement 1.

An intersection between a symmetry plane of the flap 3, which runs perpendicularly to the flap pivot axis Ak and the flap pivot axis Ak is marked P0k. During the pivot movement about the flap pivot axis Ak, the flap 3 has a flap moment of inertia Jk about the point P0k.

In the table below, the characteristic variables of the flap are identified:

| Abbreviation | Designation |
| --- | --- |
| Ak | Flap pivot axis |
| P0k | Interface between the symmetry plane of the flap which runs perpendicularly to the pivot axis and the flap pivot axis |
| P1k | Flap connecting point |
| Sk | Flap center of gravity |
| rsk | Distance flap pivot axis - flap center of gravity |
| rp1k | Distance flap pivot axis - flap connecting point |
| mk | Flap total mass |
| Jk | Flap moment of inertia about P0k |

According to FIG. 1, the test arrangement 1 includes a test stand 4 and a test frame 5. The test stand 4 has a pivot axis A, which is designed as a simulation of the flap pivot axis Ak. In particular, the pivot axis A in the test stand 1 simulates the flap pivot axis Ak on the vehicle 6.

Figure 4A:
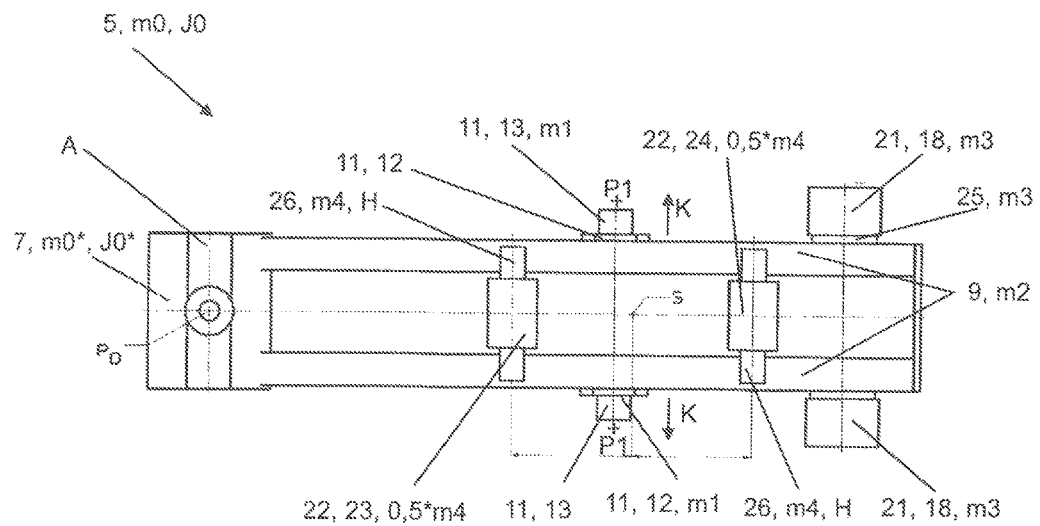
FIG. 4A is a top view from above on the test frame from FIG. 1.
Figure 4B:
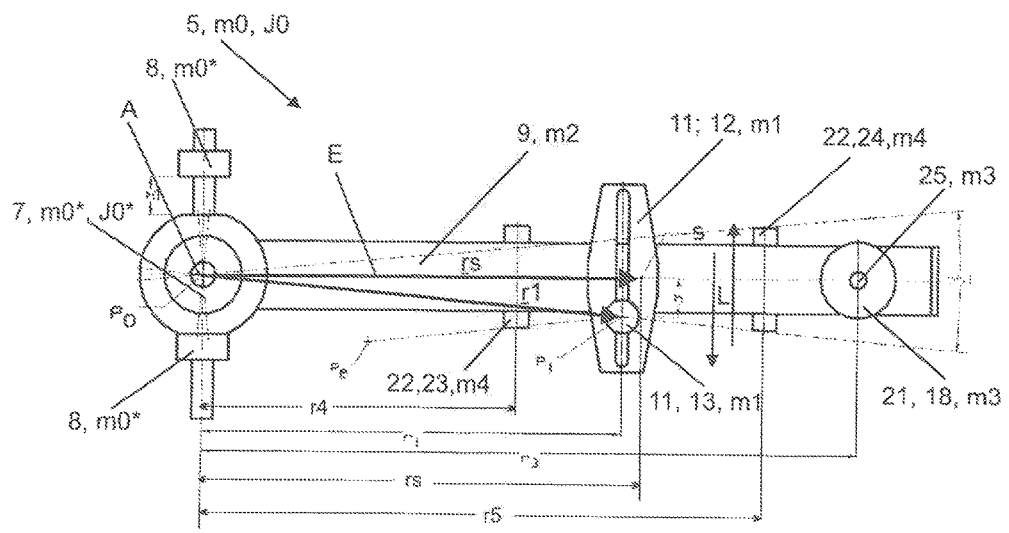
FIG. 4B is lateral top view of the test frame from FIG. 4A.
Figure 4C:
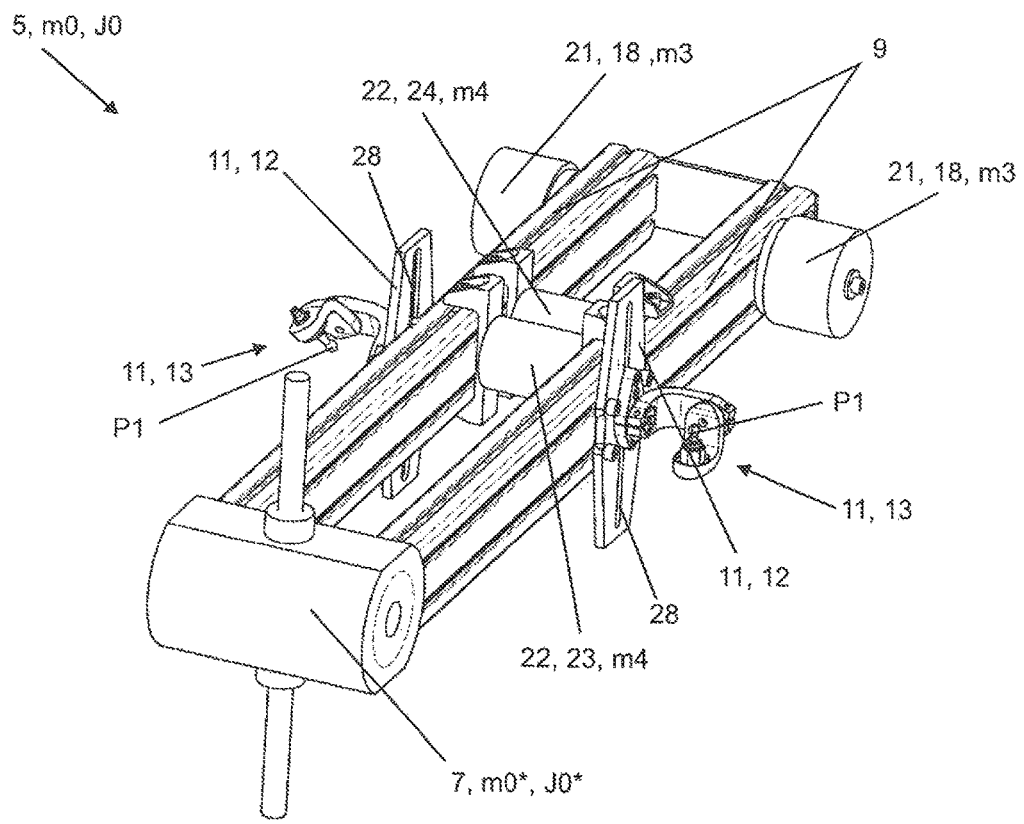
FIG. 4C is a perspective top view of the test frame from the FIGS. 4A and 4B.

The test frame 5 is designed as a function model of the flap 3. It has a center of gravity S (FIG. 4A, 4B) and a total mass m0 (FIG. 4A, 4B, 4C). An interface between a symmetry plane of the test frame 5, which is arranged perpendicularly to the pivot axis A, and the pivot axis A is marked with P0. During the pivot movement about the pivot axis A, the test frame 5 has a total moment of inertia J0 about the point P0.

Between the pivot axis A or the point P0 and the center of gravity S, a distance rs is formed. The center of gravity S and the total mass m0 of the test frame 5 are variably determinable and/or adjustable. Accordingly, the test frame 5 can simulate a wide range of flaps 3 with associated flap centers of gravity Sk and flap total masses m0 k.

As shown in FIG. 1, the test frame 5 includes a connecting device 7, via which it is connectable and/or connected to the pivot axis A. The test frame 5 has the total moment of inertia J0, with which it is pivotable towards the top O about the pivot axis A. Because of this, the opening movement of the flap 3 in particular can be simulated. Furthermore, the test frame 5 is pivotable with the total moment of inertia J0 about the pivot axis A towards the bottom U, in order to simulate the closing movement of the flap 3. During the pivoting towards the top O or towards the bottom U, the test frame 5 is pivoted about the pivot axis A by a pivot angle phi (FIG. 4B). The opening movement is supported by the damper devices 2 to be tested and the closing movement is dampened by the damper devices 2.

The damper devices 2 to be tested with the test arrangement 1 are fixed and/or fixable on the test stand 4. In a respective coupling point P1, each of the damper devices 2 is coupled to the test frame 5. The coupling point P1 is variably determinable and/or adjustable relative to the test frame 5 and/or to the test stand 4 in order to realistically simulate the flap 3 and its connecting points P0k (FIG. 3B).

The test frame 5 in FIG. 4A is shown in a top view from above, in FIG. 4B in a lateral top view and in FIG. 4C in a perspective view from the connecting device 7. By way of the connecting device 7, the test frame 5 is pivotably connectable and/or connected to the pivot axis A. The connecting device 7 has a hub mass m0 * on the axis side. Via at least one further weight component 8, the hub mass m0 * on the axis side can be varied. A distance h1 (FIG. 4B) between the at least one further weight component 8 and the point P0 is variably adjustable. The center of gravity shifting, which is accompanied by shifting the adjusting device 13 with the mass m1 along the respective receiving device 13, can be compensated through corresponding shifting of the at least one further weight component 8 with the mass m0 * by the distance h1 along the pivot axis A. In particular, the weight component 8 is shifted by the distance h1 when the distance h (FIG. 4B) is adjusted between adjusting device 13, in particular between the coupling point P1 and a plane E, is defined by the pivot axis A and the center of gravity S. Thus the following applies in particular: h=h1.

According to the FIGS. 4A and 4C, the test frame 5 includes at least two rails 9, which are designed as at least two profile rails. The at least two rails 9 are connected to the connecting device 7 in a pivotably fixed manner so that these are pivotable about the pivot axis A together with the connecting device 7. The rails have a mass m2 and an intrinsic moment of inertia J2.

The test frame 5 includes a first mass compensation device 21 and at least one second mass compensation device 22. Through the mass compensation devices 21, 22, the center of gravity S of the test frame 5 can be variably determined. The first mass compensation device 21 is arranged on the rails 9 at a distance r3 from the pivot axis A via at least one holder 25. The first mass compensation device 21 is formed by a weight component 18, which is constrained on the test frame 5, in particular constrained on the rails 9. This has a mass m3 which is variable by changing the weight component 18. The holder 25 has the mass m3, H.

At least one second mass compensation device 22 is formed by a front weight component 23, 24 that is directed towards the pivot axis A and by a rear weight component 23, 24 facing away from the pivot axis A. Both weight components 23, 24 are arranged on the rails 9 by way of a further holder 26 each and shiftably mounted in the rails 9. In particular, the further holders 26 form slides which are moveable along the rails.

Figure 6:
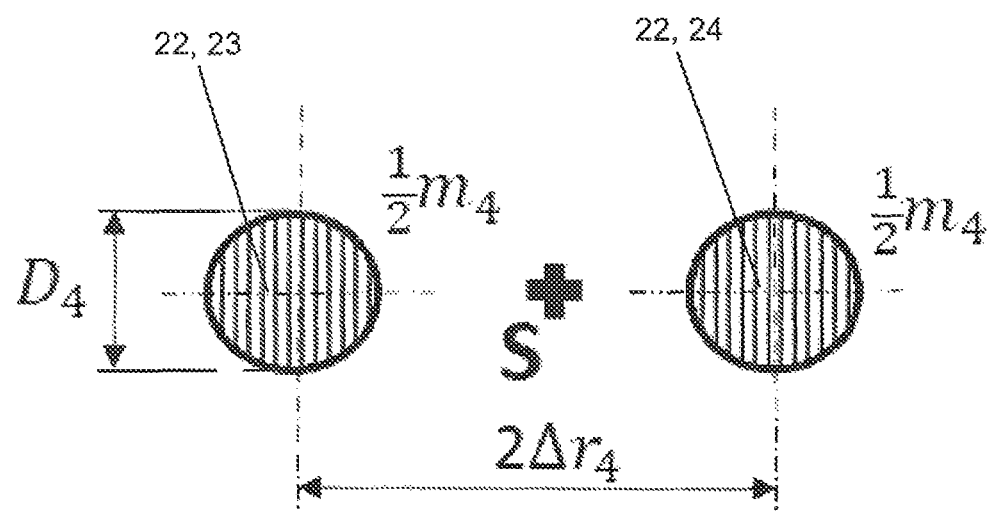
FIG. 6 shows an arrangement of two weight components relative to a center of gravity of the test frame.

FIG. 6 shows a positioning of the front and rear weight component 23, 24 relative to the center of gravity S. Both weight components 23, 24 are designed cylindrical and/or annular in cross section. Each of the weight components 23, 24 has a same diameter D4. Both weight components 23, 24 together have the mass m4 of the second mass compensation device 22, wherein the mass m4 in each case is distributed by half over both weight components 23, 24. Thus, each of the weight components has a mass of 0.5*m4. The further holders 26 jointly have a mass m4 , H, half of which is divided in each case over the holders 26.

The sliding capability of additional holders 26 and the front and rear weight components 23, 24 along the rails 9 means that, their position relative to the pivot axis A is variable. In particular, a distance r4 (FIG. 4B) between the pivot axis A or the point P0 and the front weight component 23 and a distance r5 (FIG. 4B) between the pivot axis A or the point P0 and the rear weight component 24 is variably adjustable. Thus, a distance delta r4 ($\Delta r4$) of each weigh component 23, 24 to the center of gravity S is also variably adjustable.

Upon a shifting by a distance of the same size of the further holders 26 and the front and rear weight components 23, 24 in each case in opposite directions along the rails 9 it is achieved that the center of gravity remains stationary and/or is not changed with respect to its position. By contrast, the mass moment of inertia m0 of the test frame 5 can be variably adjusted about the pivot axis A through the shifting described above.

On each of the at least two rails 9, the test frame 5 includes a coupling device 11. By way of the coupling device 11, the respective damper device 2 is coupleable in the coupling point P0 to the test frame 5, in particular the respective rail 9. The coupling device 11 includes a receiving device 12 and an adjusting device 13. The receiving device 12 has a mass m1 , H and an intrinsic moment of inertia J1, H. The receiving device 12 is designed for receiving the adjusting device 13. It is shiftable along the respective rail 9 so that a distance r1 (FIG. 4B) between the pivot axis A or the point P0 and the receiving device 12 is variably adjustable. Thus, the distance r1 between the pivot axis A or the point P0 and the adjusting device 13, in particular the coupling point P1, is variably adjustable. In particular, the position of the coupling device 11 can be adjusted independently of a relative angle, at which the respective damper device 2 is coupled to the coupling device 11, and/or substantially independently of the center of gravity S of the test frame 5.

The adjusting device 13 is designed for adjusting the coupling point P1. It includes an engagement device 14 (FIG. 5), with which it engages in a recess 28 of the receiving device 12 and is shiftable along the same in a first direction and opposite direction L. Because of this, a distance h (FIG. 4B) between the coupling point P1 and a plane E, which is defined by the pivot axis A and the center of gravity S, is variably adjustable.

The engagement device 14 includes at least one engagement component 27, for example two engagement components 27. The engagement components 27 are designed in order to positively engage in the recess 28 of the receiving device 12. The positive connection is formed in a second direction K, which is directed at an angle, in particular at a right angle relative to the first direction and opposite direction (L).

Figure 5:
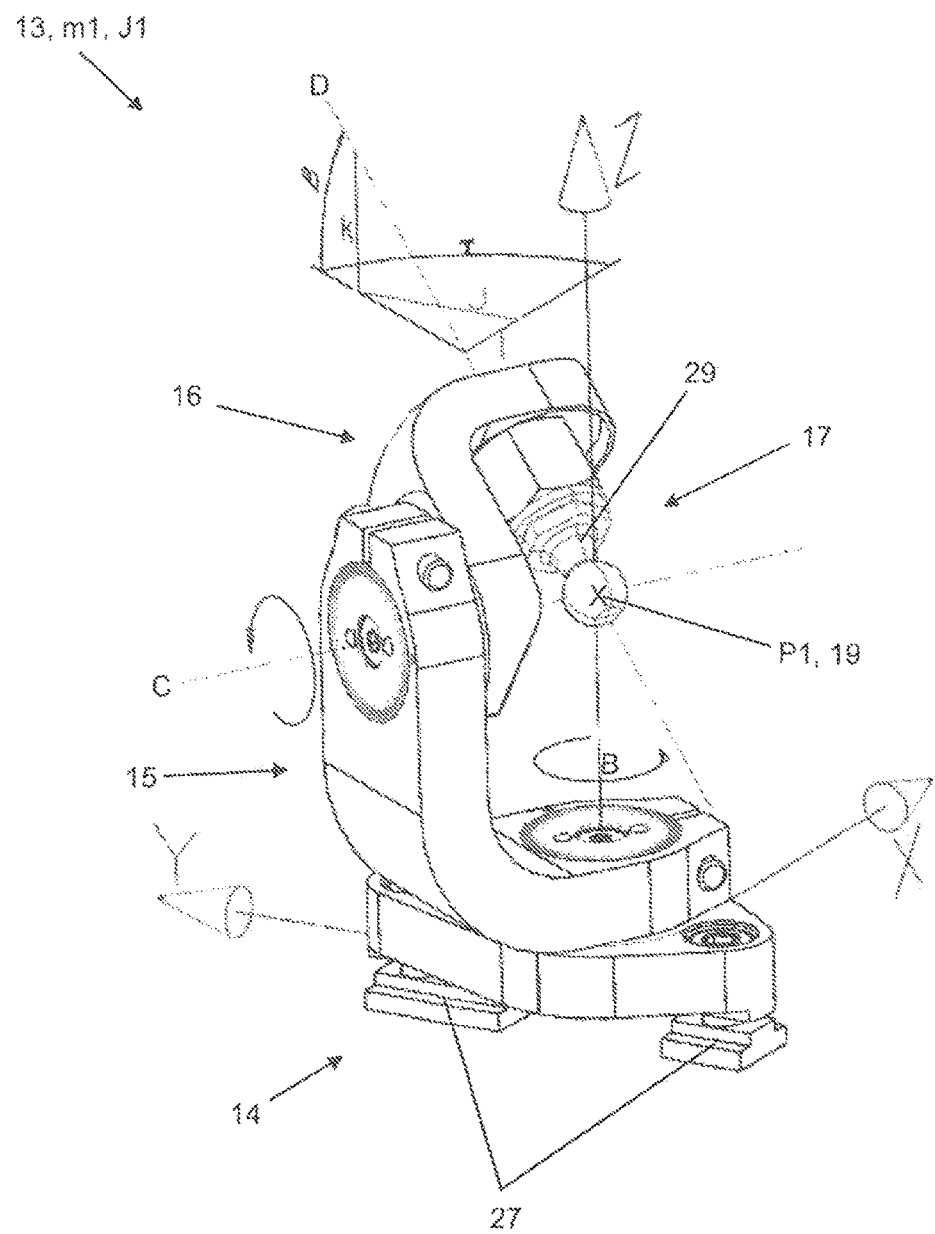
FIG. 5 is a perspective front view of an adjusting device of the test arrangement.

FIG. 5 shows a perspective top view from the front of the adjusting device 13. The adjusting device 13 has a mass m1 and an intrinsic moment of inertia J1. The adjusting device 13 includes the engagement device 14, with which the adjusting device 13 engages in the receiving device 12 and along which it is shiftable.

The adjusting device 13 includes a foot 15, a neck 16 and a head 17. The foot 15 is arranged at or on the engagement device 14. The foot 15 supports the neck 16, on the neck 16, the head is arranged in a rotationally fixed manner.

The foot 15 and the neck 16 are designed L-shaped and each include a short and a long leg. The foot 15 stands with the short leg on the engagement device 14 and is rotatably mounted relative to the same. The neck 16 with its long leg is arranged on the long leg of the foot 15 and rotatably mounted relative to the same. On the short leg of the neck 16, the head 17 is arranged in a rotationally fixed manner.

The foot 15 is rotatable relative to the engagement device 14 about a first axis of rotation B. The neck 16 is rotatable relative to the foot 15 about a second axis of rotation C. The foot 15 and the neck 16 are arranged in a kinematic chain. Because of this, the neck 16 and the foot 15 are jointly rotatable relative to the engagement device 15 about the first axis of rotation B.

The head 17 is connected to the neck 16 in a rotationally fixed manner, so that the head 17 is rotatable jointly with the neck 16 about the second axis of rotation C relative to the foot 15 and jointly with the neck 16 and the foot 15 about the first axis of rotation B relative to the engagement device 14.

By turning the foot 15 about the first axis of rotation B, the head 17 is rotatable in an angle of rotation gamma (γ) relative to the engagement device 14. Complementarily, the head 17 is rotatable relative to the foot 15 in an angle of rotation beta (β) by rotating the neck 16 about the second axis of rotation C.

The first axis of rotation B runs perpendicularly or substantially perpendicularly and the second axis of rotation C particular at a right angle relative to one another and intersect in a point of intersection X.

The head 17 includes the coupling interface 19, which is designed for coupling to the coupling mating interface 20 of the respective damper device 2. The coupling interface 19 is designed spherical. It defines the coupling point P1. The coupling point P1 is constrained in at least two degrees of freedom, in particular rotation degrees of freedom independently of the adjustment of the adjusting device 13. Here, the coupling point P1 is constrained independently of a rotation of a first and of a second axis B, C, wherein the first axis B and second axis C run at an angle, in particular right angle, to a third axis D. The third axis D runs centrally through the coupling interface 19 and/or through the coupling point P1 and through a connection 29 of the coupling interface 19 to the neck 16. In the exemplary embodiment of FIG. 5, the first axis B corresponds to the first pivot axis B and the second axis C to the second pivot axis C. Because of this, the coupling point P1 is constrained independently of the angle of rotation gamma (γ) of the foot 15 about the first pivot axis B and independently of the angle of rotation beta (β) of the neck 16 about the second pivot axis C.

The coupling interface 19 and/or the coupling point P1 are always arranged in particular independently of the rotation of the foot 15 about the first axis of rotation B and in particular independently of the rotation of the neck 16 about the second axis of rotation C in the point of intersection X. Because of this, a relative angle between the coupling interface 19 and the coupling mating interface 20 is adjustable independently of parameters such as variably adjustable distances in the test stand 4, on the test stand 5 and/or on the rails 9 and the variably adjustable center of gravity S. Thus it can be ensured that the coupling point P1 is realistically positionable and the respective damper device 2 (FIG. 2) is coupleable therein easily, quickly and free of resistance.

In the table below, the characteristic variables of the test frame as function model of the flap are listed.

| Reference number | Designation | Center of gravity | Mass [m] | Intrinsic moment of inertia [kgm] | Moment of inertia about P0 [kgm$^2$] |
|---|---|---|---|---|---|
| 5 | Test frame | rs | m0 | J0 | J0 |
| 7 | Connecting device | 0 | m0* | — | — |
| 13 | Adjusting device | r1 | m1 | J1 | J1 + m1 * r1$^2$ |
| 12 | Receiving device | r1 | m1, H | J1, H | J1, H + m1, H * r1$^2$ |
| 9 | Rails | r2 | m2 | J2 | J2 + m2 * r2$^2$ |
| 21 | First mass compensation device | r3 | M3 | J3 | J3 + m3 * r3$^2$ |
| 25 | Holder of the first mass compensation device | r3 | m3, H | J3, H | J3, H + m3, H * r3$^2$ |
| 22 | Second mass compensation device | r4, r5 | m4 | J4 | J4 + m4 * r2$^2$ |
| 26 | Holder of the second mass compensation device | r4, r5 | m4, H | J4, H | J4, H + m4, H * rs$^2$ + (m4 + m4, H) * Δr4$^2$ | horizontally or substantially horizontally, when the adjusting device 13 with the engagement device 14 stands on a level surface. Both axes of rotation B, C run at an angle, in The static equivalence conditions between the flap and the test frame shall be calculated as follows, presuming the same masses of the flap and the test frame:

$$\sum_i m_i = m_k \Rightarrow m0 * + m1 + m1, H + m2 + m3 + m3, \quad (1)$$

$$H + m4 + m4, H = mk \Leftrightarrow m0 * = mk - m1 - m1,$$

$$H - m2 - m3 - m3, H - m4 - m4, H$$

with $$0 \le m0 * \le m0$$

And presuming the same centers of gravity of the flap and the test frame:

$$\frac{\sum_i r_i * m_i}{\sum_i m_i} = \quad (2)$$

$$r_s \Rightarrow \frac{r1*(m1+m1, H)+r2*m2+r3(m3+m3, H)}{m0*+m1+m1, H+m2+m3+m3, H} = rs$$

$$(1) \text{ in } (2) \Rightarrow \frac{r1*(m1+m1, H)+r2*m2+r3(m3+m3, H)}{mk-(m4+m4, H)} = rs$$

$$\Leftrightarrow r3 = rs * \frac{mk-(m4+m4, H)}{m3+m3, H} - r1 * \frac{m1}{m3+m3, H} - r2 * \frac{m2}{m3+m3, H}$$

The dynamic equivalence conditions between the flap and the test frame are calculated as follows, presuming the same moments of inertia of the flap and of the test frame about the corresponding pivot axis:

$$\sum (J_i + m_i * r_i^2) = J_k \Rightarrow J0 * + J1 + J1, \quad (3)$$

$$H + J2 + J3 + J3, H + J4 + J4,$$

$$H + \Delta J4 + (m1+m1, H)*r1^2 + m2*r2^2 + (m3+m3, H)*r3^2 +$$

$$(m4+m4, H)*rs^2 = Jk \Leftrightarrow \Delta J4 = Jk - (J0 + J1 + J1,$$

$$H + J2 + J3 + J3, H + J4 + J4, H + (m1+m1, H)*r1^2 +$$

$$m2*r2^2 + (m3+m3, H)*r3^2 + (m4+m4, H)*rs^2)$$

With reference to FIG. 6, the distance $\Delta r4$ of both weigh components 23, 24 from the center of gravity S shall be calculated as follows:

$$J4 = 2 * \left(\frac{1*m4}{8*2} * D4^2\right) = \frac{1}{8} * m4 * D4^2 \quad (4)$$

$$\Delta J4 = (m4+m4, H) * \Delta r4^2$$

$$\Rightarrow$$

$$\Delta r4 = \sqrt{\frac{\Delta J4}{m4+m4, H}}$$

(3) in (4) $\Rightarrow \Delta r4 =$ $$\sqrt{\frac{Jk - (J0+J1+J1, H+J2+J3+J3, H+J4+J4, H+(m1+m1, H)*r1^2 + m2*r2^2 + (m3+m3, H)*r3^2 + (m4+m4, H)*rs^2)}{m4+m4, H}}$$

With reference to FIG. 4B, the position of the coupling point P1, in particular the distance r1 between the point P0 and the coupling point P1 and the distance h between the plane E and the coupling point PT shall be calculated as follows:

$$r1 = \frac{rp1 * rs}{rs}$$

$$h = \sqrt{rp1^2 - rp0^2}$$

With reference to FIG. 5, the angles of rotation β and γ of the coupling point P1 through rotation of the foot 15 about the first axis of rotation B and/or through rotation of the neck 16 about the second axis of rotation C are calculated as follows:

$$\gamma = \arctan\left(\frac{J}{I}\right)$$

$$\beta = \arctan\left(\frac{K}{\sqrt{I^2 + J^2}}\right)$$

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A test arrangement for testing damper devices for damping a flap that is pivotable about a flap pivot axis comprising:
    a test stand with a pivot axis configured to simulate the flap pivot axis;
    a test frame configured as a function model of the flap;
    a connecting device for pivotably connecting the test frame to the test stand about the pivot axis; and
    at least two damper devices each operably coupled with a coupling device between the test stand and the test frame for dampened pivoting of the test frame about the pivot axis;
    wherein the coupling device comprises a receiving device configured to receive an engagement device on an adjusting device, wherein the adjusting device is operable to adjust the coupling point with the respective damper device;
    wherein the adjusting device comprises a foot arranged on the engagement device and supporting a neck, and a head connected to the neck, wherein the foot is rotatable relative to the engagement device about a first axis of rotation and the neck is rotatable jointly with the head about a second axis of rotation relative to the foot.

2. The test arrangement according to claim 1, wherein the test frame has a total mass, a center of gravity and a coupling point for coupling each of the at least two damper devices on the test frame, wherein at least one of the total mass, the center of gravity and the coupling point is adjustable on the test frame.

3. The test arrangement according to claim 1, wherein the test frame comprises at least two rails, wherein each of the rails includes the coupling device for connecting one of the at least two damper devices to the respective rail.

4. The test arrangement according to claim 3, wherein the coupling device is shiftable along the respective rail so that a distance between the pivot axis and one of the coupling device or the coupling point is variably adjustable.

5. The test arrangement according to claim 1, wherein the test frame comprises at least one mass compensation device having a first mass compensation element which is variable in mass and stationary in position, and a second mass compensation element which is variable in the mass and variable in the position.

6. The test arrangement according to claim 5, wherein the second mass compensation element is shiftable along at least two rails, so that a distance between the pivot axis and the second mass compensation element is variably adjustable.

7. A test arrangement for testing damper devices for damping a flap that is pivotable about a flap pivot axis comprising:
- a test stand with a pivot axis configured to simulate the flap pivot axis;
- a test frame configured as a function model of the flap;
- a connecting device for pivotably connecting the test frame to the test stand about the pivot axis, wherein the test frame comprises at least one rail that extends away from the pivot axis;
- a damper device operably coupled between the test stand and the test frame for dampened pivoting of the test frame about the pivot axis; and
- a coupling device disposed on the test frame and configured to connect the damper device to the rail;
- wherein the coupling device comprises:
  - an adjusting device configured to couple with the damper device at a coupling point, and configured to adjust the coupling point relative to the test stand;
  - an engagement device disposed on the adjusting device; and
  - a receiving device that includes a recess and that is configured to receive the engagement device and to shift along the rail, wherein the engagement device includes at least one engagement component engaged in the recess so that the adjusting device is configured to shift along the recess of the receiving device.

8. The test arrangement according to claim 7, wherein the engagement device is shiftable so that a distance between a plane E including the pivot axis and the center of gravity and at least one of the adjusting device and the coupling point is variably adjustable.

9. The test arrangement according to claim 7, wherein the adjusting device comprises a foot arranged on the engagement device and supporting a neck, and a head connected to the neck, wherein the foot is rotatable relative to the engagement device about a first axis of rotation and the neck is rotatable jointly with the head about a second axis of rotation relative to the foot.

10. The test arrangement according to claim 9, wherein the first axis of rotation and the second axis of rotation extend at an angle relative to one another and intersect at a point of intersection.

11. The test arrangement according to claim 10, wherein the angle is a right angle.

12. The test arrangement according to claim 9, wherein the foot and the neck are arranged in a kinematic chain such that the neck together with the foot is rotatable relative to the engagement device about the first axis of rotation.

13. The test arrangement according to claim 9, wherein the head comprises a coupling interface defining a coupling point for the respective damper device.

14. The test arrangement according to claim 13, wherein the first axis of rotation and the second axis of rotation intersect at a point of intersection wherein at least one of the coupling interface and the coupling point are arranged at the point of intersection.

15. The test arrangement according to claim 13, wherein the damper device comprises a coupling mating interface for coupling to the coupling interface of the adjusting device.

16. A test arrangement for testing damper devices for damping a flap that is pivotable about a flap pivot axis comprising:
- a test stand with a pivot axis configured to simulate the flap pivot axis;
- a test frame configured as a function model of the flap;
- a connecting device for pivotably connecting the test frame to the test stand about the pivot axis;
- a damper device operably coupled between the test stand and the test frame for dampened pivoting of the test frame about the pivot axis, wherein the test frame comprises at least two rails that extend away from the pivot axis;
- a coupling device disposed on the test frame and configured to connect the damper device to the rail;
- a first mass compensation device constrained outside the rails at a first distance from the pivot axis; and
- a second mass compensation device with at least one weight component arranged between the rails by way of a holder, the weight component shiftably mounted on the rails between the pivot axis and the first mass compensation device.

* * * * *